TYPEWRITER TAPE PUNCH WITH AUTOMATIC LETTERS-FIGURES SHIFT

Filed June 22, 1960 12 Sheets-Sheet 1

INVENTOR.
JOHN E. HICKERSON
BY Ralph C. Dustin
ATTORNEY.

Aug. 21, 1962 J. E. HICKERSON 3,050,241

TYPEWRITER TAPE PUNCH WITH AUTOMATIC LETTERS-FIGURES SHIFT

Filed June 22, 1960 12 Sheets-Sheet 5

TYPEWRITER TAPE PUNCH WITH AUTOMATIC LETTERS-FIGURES SHIFT

Aug. 21, 1962 J. E. HICKERSON 3,050,241

TYPEWRITER TAPE PUNCH WITH AUTOMATIC LETTERS-FIGURES SHIFT

Filed June 22, 1960 12 Sheets-Sheet 9

Aug. 21, 1962 J. E. HICKERSON 3,050,241

TYPEWRITER TAPE PUNCH WITH AUTOMATIC LETTERS-FIGURES SHIFT

Filed June 22, 1960 12 Sheets-Sheet 10

Aug. 21, 1962 J. E. HICKERSON 3,050,241

TYPEWRITER TAPE PUNCH WITH AUTOMATIC LETTERS-FIGURES SHIFT

Filed June 22, 1960 12 Sheets-Sheet 12

United States Patent Office 3,050,241

Patented Aug. 21, 1962

3,050,241

TYPEWRITER TAPE PUNCH WITH AUTOMATIC LETTERS-FIGURES SHIFT

John E. Hickerson, Lexington, Ky., assignor to International Business Machines Corporation, New York, N.Y., a corporation of New York Filed June 22, 1960, Ser. No. 38,016
12 Claims. (Cl. 234—23)

This invention relates to typewriter-tape punches, and more particularly to mechanisms connected to a typewriter and operating to punch characters in code form in a tape simultaneously with the printing of the same characters.

The punch mechanism of this invention is operatively connected to a typewriter like that shown in U.S. Patent 2,919,002, issued December 29, 1959, to L. E. Palmer. This typewriter has six elements which are operated in different combinations to effect the positioning of a print head for printing any one of various characters. The punch mechanism includes one group of thin metal strips or slides positioned by the six typewriter elements and controlling the movement of a selected one of various sensing devices through openings in a second group of slides. The openings are so formed that a combination of the second group of slides are permitted to move relative to the sensing device and effect a punching of holes corresponding to the character typed. Any number of slides may be employed in the second group depending on the desired punch code. Since telegraphic equipment usually operates on a five hole code, there has been shown herein five slides in the second group for controlling five punch elements. It is impossible to represent all of the characters needed by a five hole code and so each code punching must represent either of two characters.

When a code punching must represent more than one character, it has been customary to precede either one or a group of code punches for alphabetic characters by a "letter" shift code. Code punches for one or more numeric or special characters are preceded by a "figure" shift code. The interpretation of a character code then depends on the shift code preceding it. Most mechanisms for punching shift codes require the actuation of one or another of two shift keys before actuating a character key. This requires additional effort by the operator and two cycles of operation each time a change is made from one type of character to the other.

Associated with the punch mechanism of this invention are means which operate automatically to punch shift codes when needed. This mechanism includes two slides, one moving on the first actuation of a key for typing letters to cause the punching of a "letter" shift code, and the other moving on the first actuation of a key for figures or special characters to cause the punching of a "figure" shift code. The punching of the shift code in each case takes place simultaneously with the punching of the code for the character of the key actuated.

An object of this invention is to provide an improved mechanism connected to a typewriter and operating simultaneously therewith for punching in a tape the same information being typed.

Another object is to provide, in a tape punch mechanism, means operating automatically to punch either a "letter" shift code or a "figure" shift code preceding the punching of characters.

Still another object is to provide an improved tape punch having means for punching shift codes simultaneously with the punching of characters which are identified by the shift code.

Other objects of the invention will be pointed out in the following description and claims and illustrated in the accompanying drawings, which disclose, by way of example, the principle of the invention and the best mode, which has been contemplated, of applying that principle.

Figure 3A:
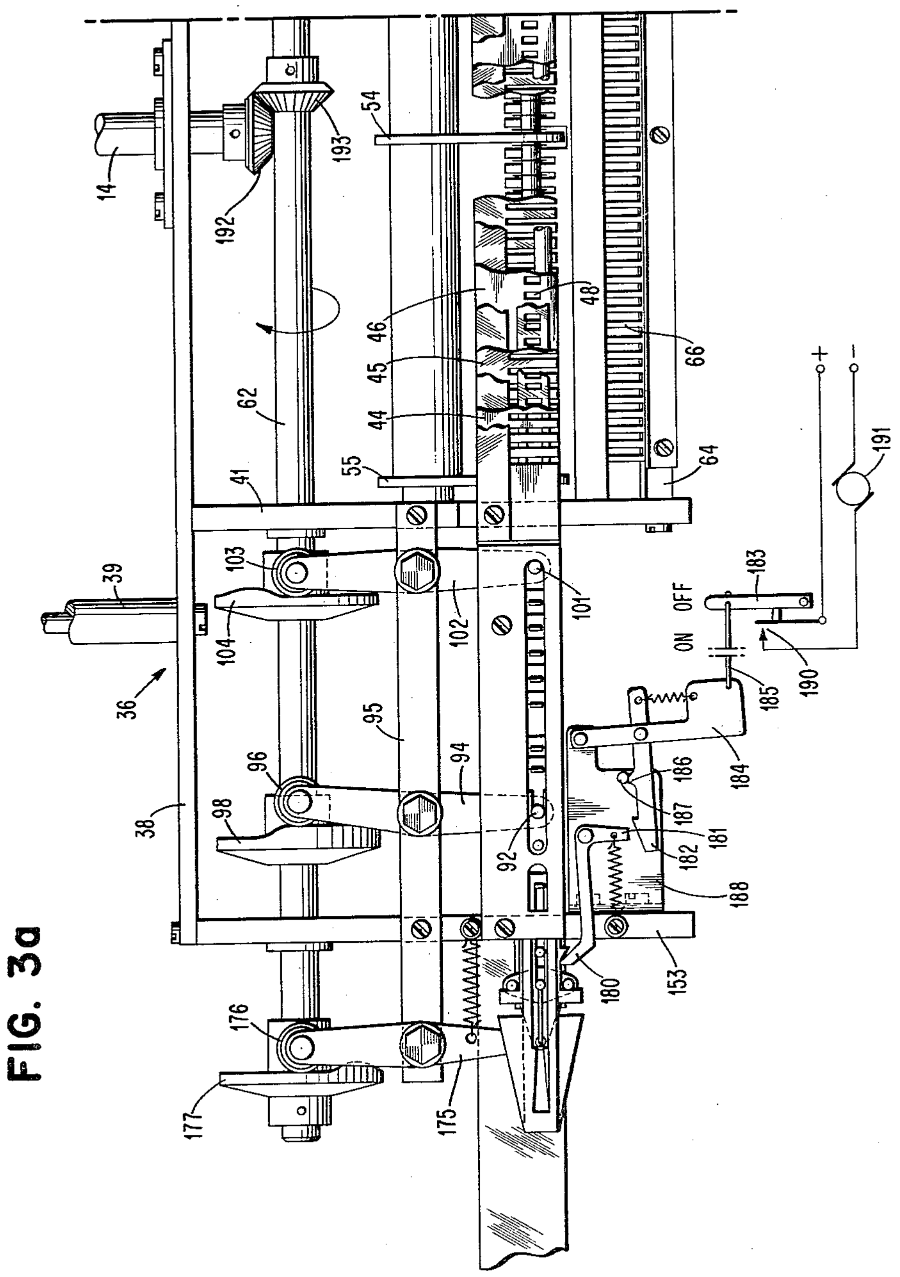
Figure 3B:
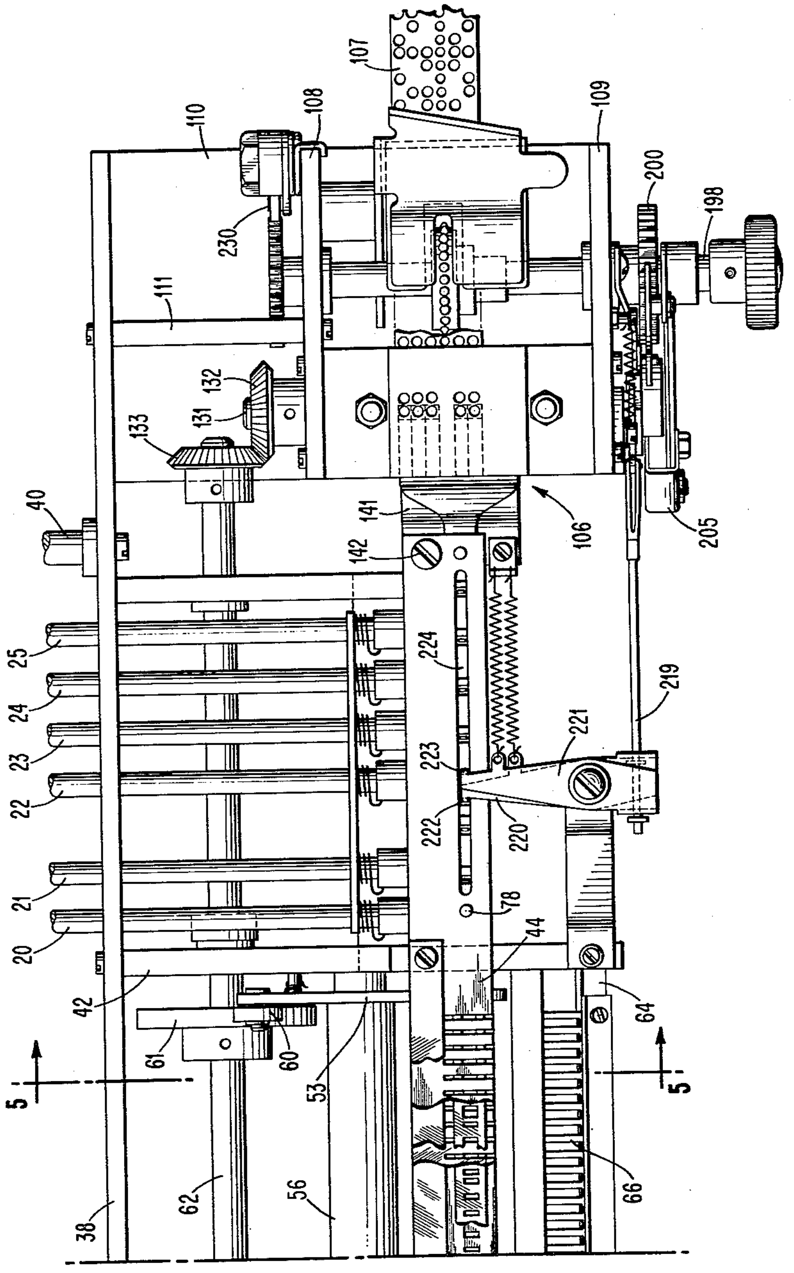

FIGS. 3*a* and 3*b* together constitute a plan view of the punch mechanism associated with the typewriter.

Figure 4A:
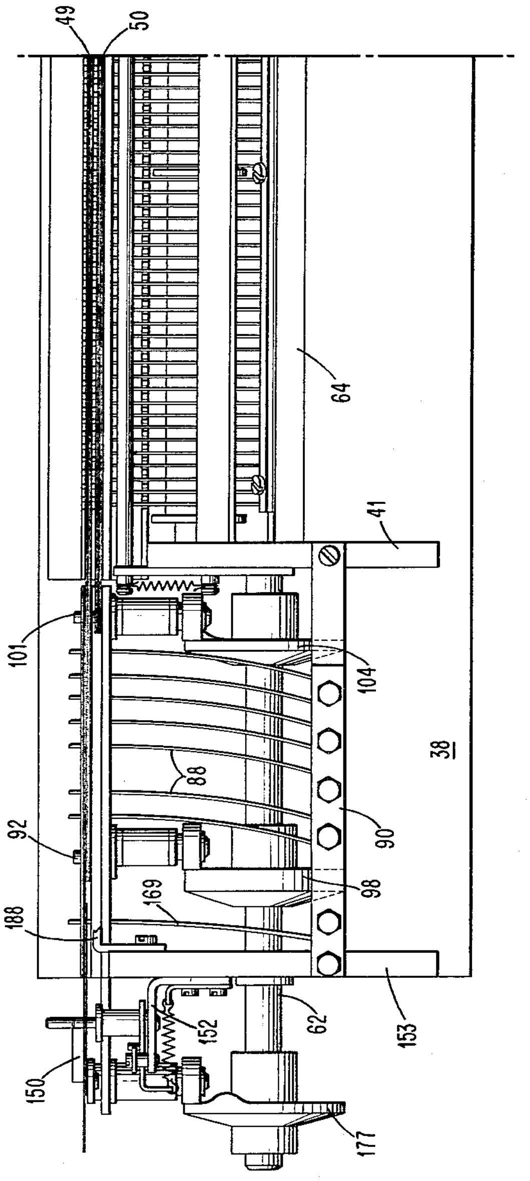
Figure 4B:
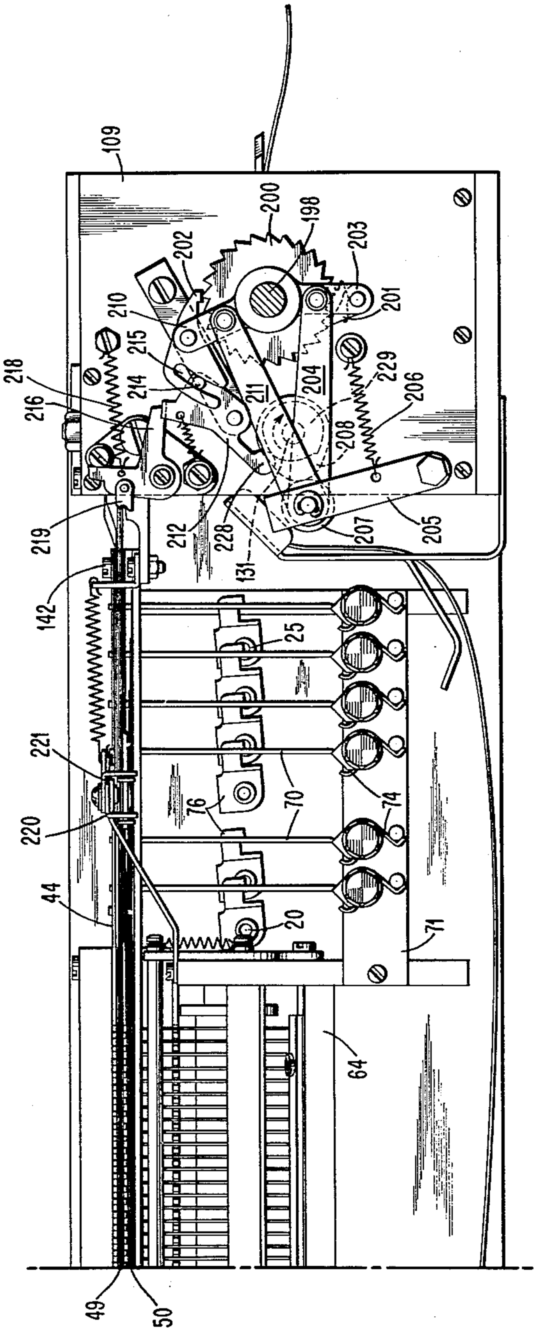

FIGS. 4*a* and 4*b* together constitute a side elevational view of the punch mechanism.

Figure 5:
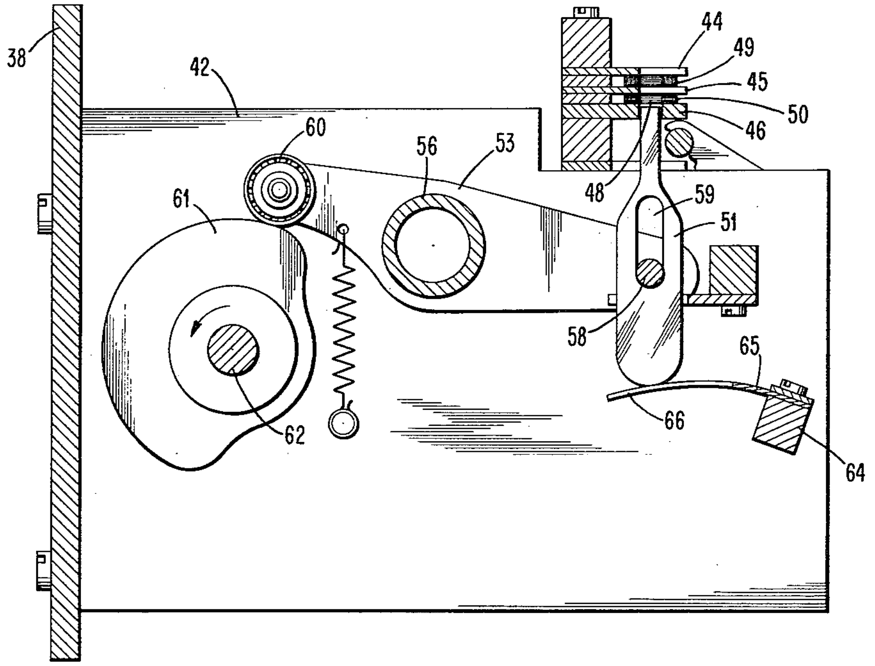

FIG. 5 is a vertical sectional view taken on the plane of the line 5—5 in FIG. 3*b*.

Figure 6:
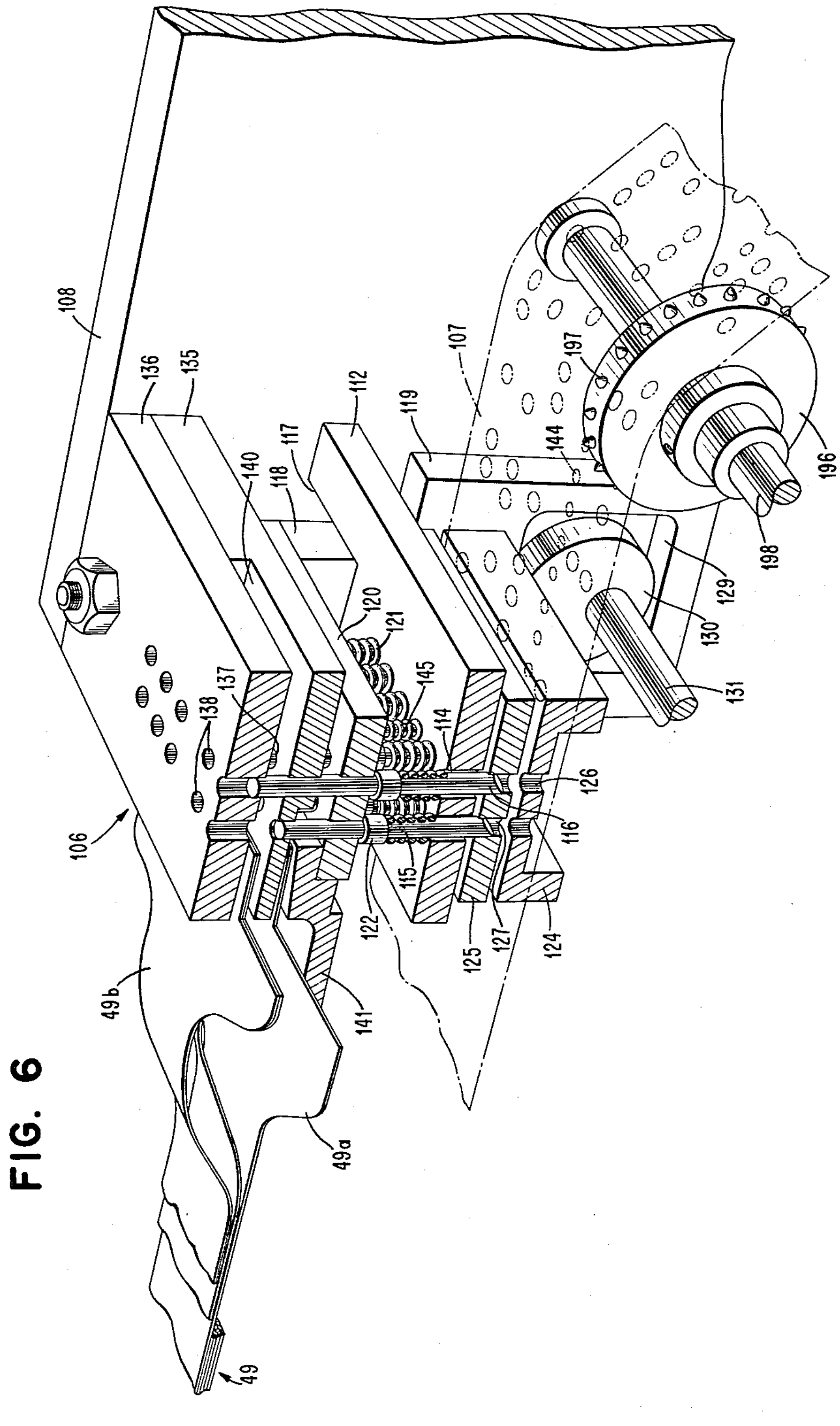

FIG. 6 is an enlarged perspective view, with parts shown in section, of the tape punch at the right hand end of the mechanism shown in FIG. 3*b*.

Figure 7:
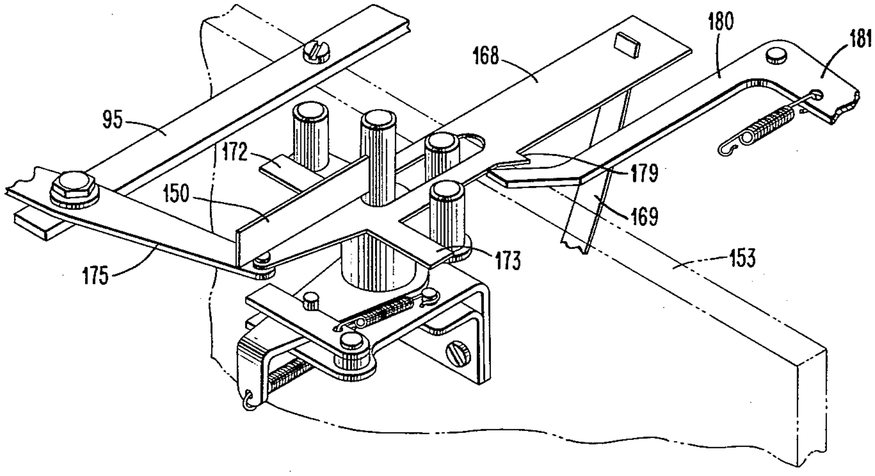

FIG. 7 is an enlarged perspective view of a latch mechanism which is operable to control movement of slides effecting the punching of shift codes, the mechanism having parts shown in positions assumed when the machine is not operating.

Figure 8:
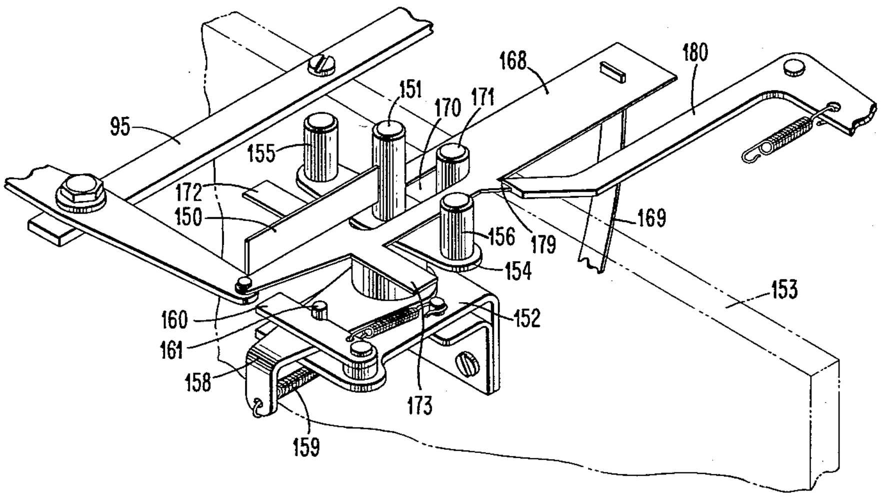

FIG. 8 is a view like FIG. 7 but showing parts in positions to which they are moved just after the machine is started.

FIGS. 9 to 12 show the latch element in different positions for controlling the shift code slides.

Figure 13A:
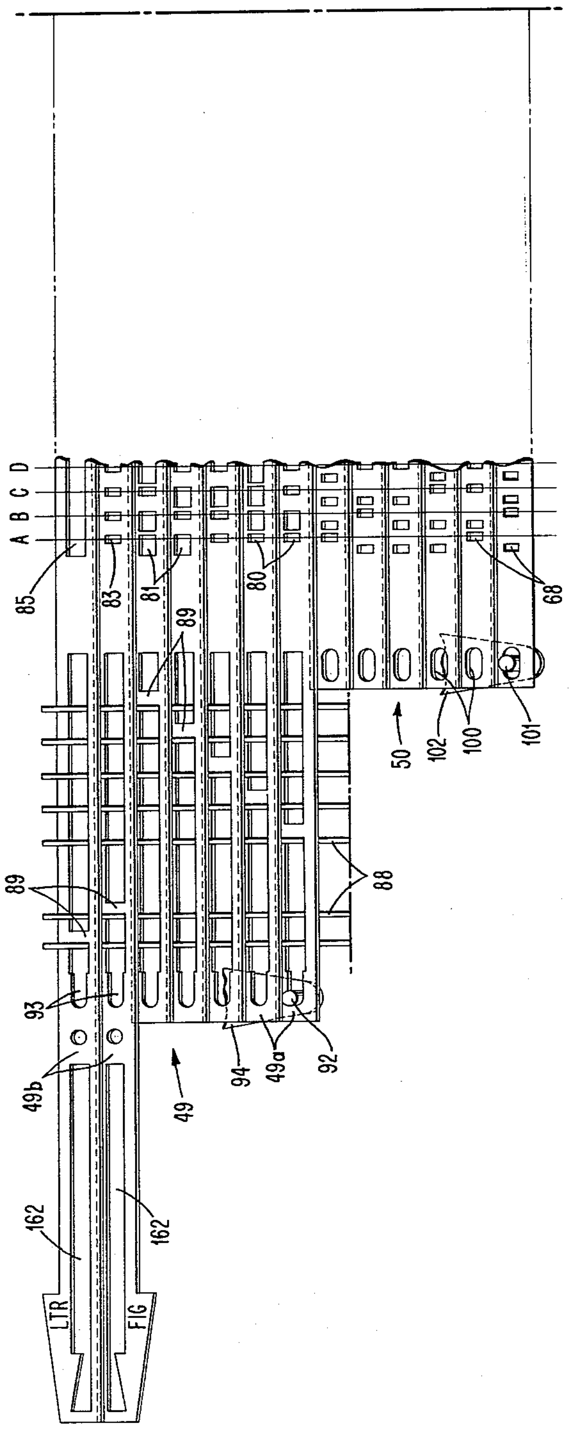
Figure 13B:
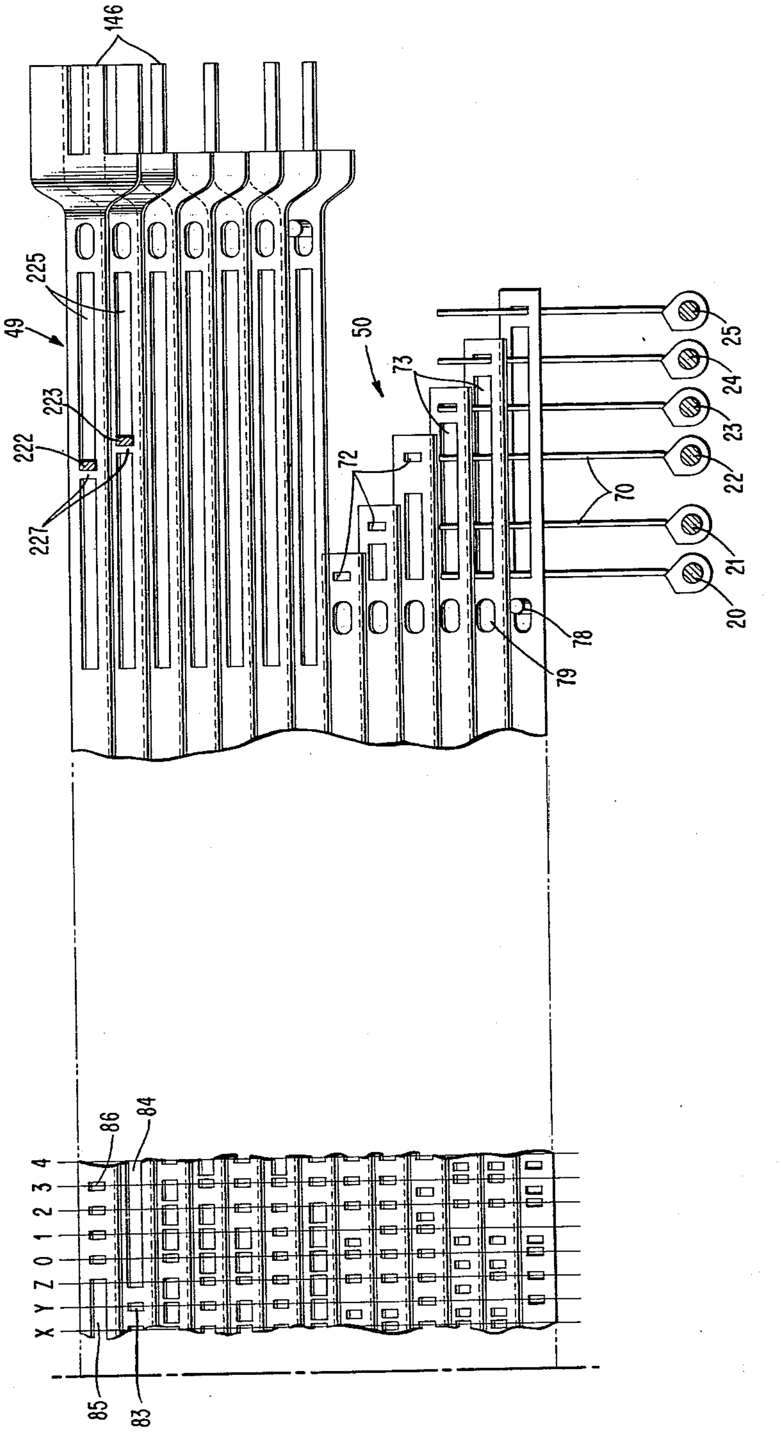

FIGS. 13*a* and 13*b* together show the different slides used in the punch mechanism.

Figure 1:
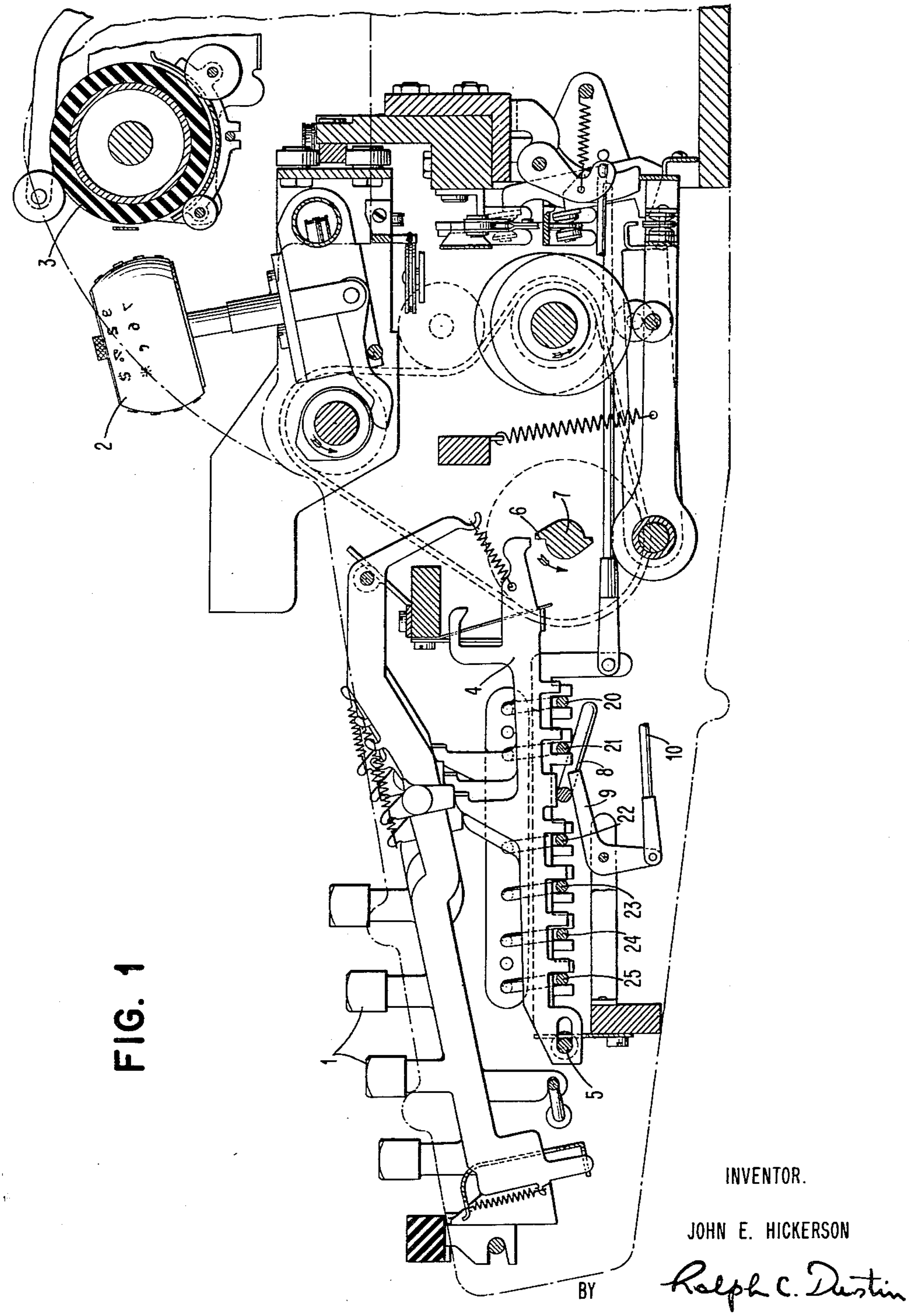
FIG. 1 is a sectional view taken on the line 1—1 of FIG. 2 showing a typewriter with which the improved punch mechanism is associated.

The improved punch mechanism is shown herein associated with a typewriter like that of the patent mentioned above. This typewriter includes, as shown in FIG. 1, a plurality of key levers 1 which may be actuated to effect a rotating and tilting of a print head 2 to present a character corresponding to the key lever in position for engagement with a platen 3. As one of the key levers is depressed, an interposer 4 is pivoted about a pin 5 until its right hand end lies in the path of a flange 6 on a filter shaft 7. A downward pivoting of any interposer causes a bail 8 to be rocked against a bellcrank 9 for actuating the latter to pull on a rod 10. Actuation of the rod 10 engages a clutch to connect a continuously rotating shaft 12 (FIG. 2) to a shaft 14 for driving the latter one revolution. At the left end of the shaft 14 is a pulley 15 connected through a belt 16 to a pulley 17 fixed to the filter shaft 7. The driving ratio is such that the shaft 7 makes one half revolution for each revolution of the shaft 14. As the filter shaft rotates, any interposer in its path is driven longitudinally to rock one or more of six bails 20 to 25. A rocking of the bails causes one or more of six rods 26 to 31 to be actuated for driving mechanisms to rotate and tilt the type head. These mechanisms will not be described because they form no part of the present invention.

Figure 2:
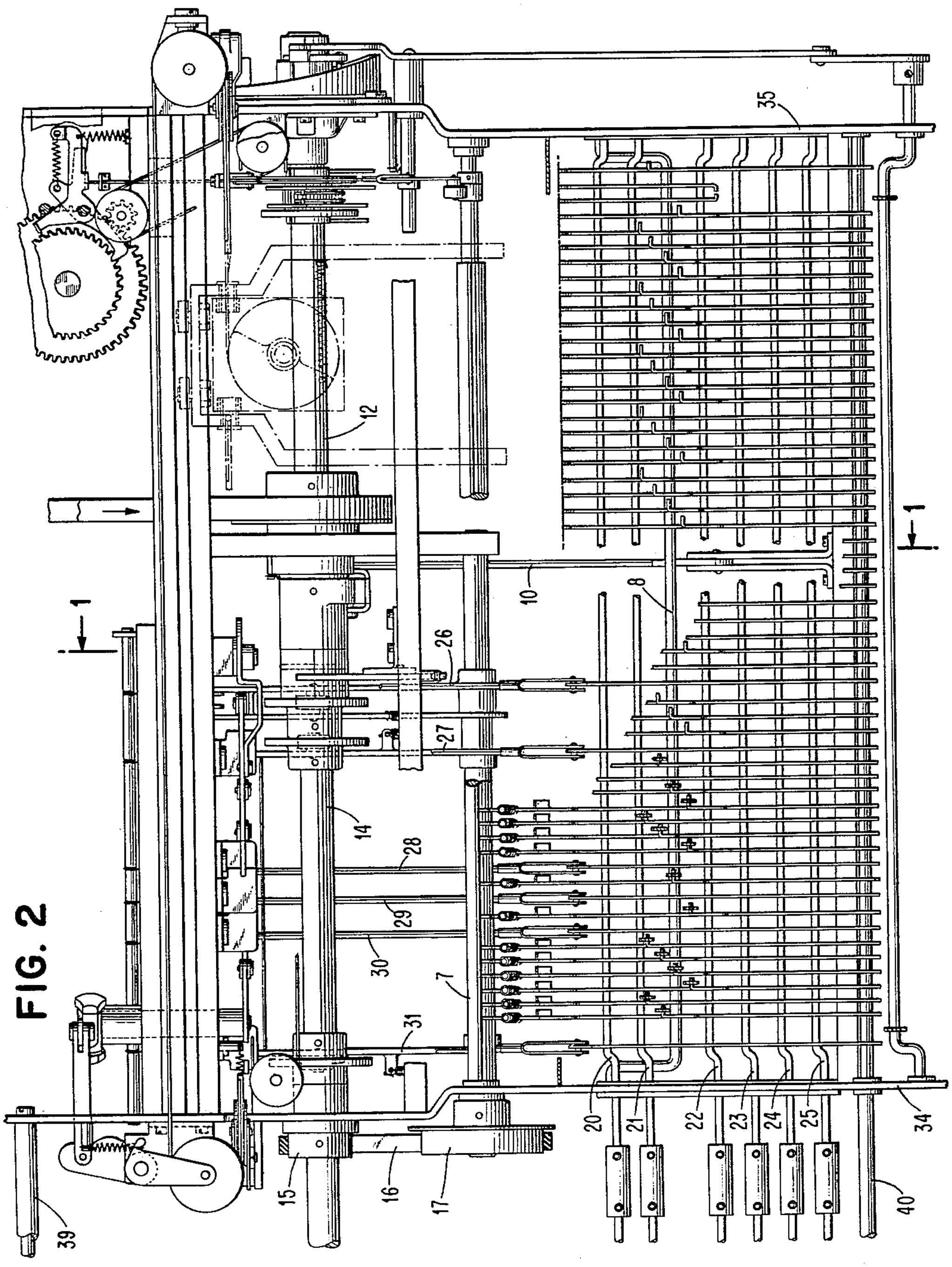
FIG. 2 is a plan view of the typewriter shown in FIG. 1.

As shown in FIG. 2, the bails 20 to 25 are pivotally supported by side frames 34 and 35 of the typewriter. At the left side of the typewriter is a punch mechanism, generally designated 36, shown in plan view by FIGS. 3*a* and 3*b*. This mechanism includes a plate 38 which is connected by tie rods 39 and 40 to the side frame 34. Connected to the plate 38 at spaced points and extending perpendicular thereto are plate members 41 and 42 which carry comb shaped guide members 44, 45, and a plate 46 having openings 48 in alignment with spaces between teeth on the guide combs. As shown in FIG. 5 one group of thin metal strips or slides 49 is arranged between the guide members 44 and 45 while a second group of slides 50 is arranged between the guide member 45 and the plate 46. In alignment with the space between each pair of teeth on the guide combs is a sensing pin 51. Arms 53, 54 and 55 are fixed to a shaft 56 which is rotatably supported at its ends by the plate members 41 and 42. Carried by the arms at their outer ends is a rod 58 extending through elongated slots 59 in the sensing pins. The arm 53 also carries a roller 60 which engages a cam 61 fixed to a shaft 62 rotatably supported by the plate members 41, 42 and extending parallel to the plate 38. Fixed to the plate members 41 and 42 is a bar 64 having a comb shaped spring element 65 clamped to its upper surface. Spring fingers 66 on the element 65 act on the lower ends of the sensing pins 51 for urging the latter upwardly. When the roller 60 engages a high point on the cam 61 as shown in FIG. 5, the rod 58 acts against the sensing pins at the lower ends of the slots 59 and holds the pins in positions with their upper ends extending into the openings 48 to a point just below the slides 50.

An opening 48 and spaces between the teeth of the guide combs 44 and 45 are provided for each character to be typed and punched into a tape. Referring to FIGS. 13*a* and 13*b* it will be noted that the slides 50 are provided with openings 68 which are normally out of vertical alignment at each of the different character positions. When these slides are moved to the right in a combination representative of any one of the characters, the openings 68 at that character position will be in vertical alignment over the corresponding sensing pin 51. The openings 68 at all of the other character positions will still be out of alignment. For moving the slides to the right, there are provided six arms 70 (FIGS. 4*b* and 13*b*) pivotally mounted on a side plate 71 and acting individually on each of the slides 50. As shown in FIG. 13*b*, each arm fits snugly within an opening 72 in the slide it actuates and extends through elongated slots 73 in the other slides so it may swing without actuating them. A spring 74 acts on each of the arms for urging it in a clockwise direction from the position shown. Cooperating with each arm is a latch element 76 connected to one of the bails 20 to 25. When any one of the bails is rocked by the driving of an interposer 4, its latch 76 is disengaged from the arm 70 and the spring 74 swings it in a clockwise direction for moving the slide 50 to which it is connected. It will be understood that one or more bails may be rocked for releasing arms 70 to actuate their slides simultaneously. This results in a vertical alignment of the openings 68 at a point for the character corresponding to that typed. Adjacent the right ends of the slides 50 is a pin 78 extending through elongated slots 79 in the slides for guiding the latter during their longitudinal movement.

In the group of slides 49 are five designated **49*a* which operate in a manner to be described for effecting the punching of holes representative of the different characters. Two more slides designated 49*b* are operative to effect the punching of shift codes when needed. The slides 49*a* are provided at each character position with either openings 80 just large enough to receive a sensing pin or with openings 81 long enough to permit movement of the slides relative to a pin when the latter extends through them. The openings 80 and 81 are normally aligned with each other along their right hand edges so a sensing pin may pass through them after it passes through the openings 68 in the slides 50**.

One of the slides **49*b* designated "LTR" controls the punching of the "letters" shift code while the other designated "FIG" controls the punching of the "figure" shift code. At each of the alphabetic character positions, the "FIG" slide 49*b* is provided with an opening 83 just large enough to receive one of the sensing pins. This same slide has, at the numeric character positions, an elongated slot 84 through which sensing pins may extend without affecting its movement. The "LTR" slide 49*b* has an elongated slot 85 at the alphabetic character positions so it may move relative to sensing pins extending through the slot. It also has openings 86 at the numeric character positions just large enough to receive one of the sensing pins. Each of the slides 49 is continuously urged to the right by a spring element 88 extending through elongated slots in the slides and acting on a web portion 89** (FIG. 13*a*) of the slide which it controls. These spring elements are fixed at their lower ends to a side plate 90 (FIG. 4*a*).

All of the slides 49 are normally held in home positions against the action of the spring elements 88. This is accomplished by extending a pin 92 (FIGS. 3*a* and 13*a*) through slots 93 in the slides and mounting it on a lever 94 pivotally supported on a bar 95. A roller 96 on the lever acts against a cam 98 fixed to the shaft 62. This cam normally holds the lever 94 so as to maintain the slides 49 in their home positions.

The slides 50 are held in their home positions by the latches 76 described above. At the left ends of the slides 50 are slots 100 receiving a pin 101 fixed to a lever 102 which is pivotally mounted on the bar 95 and carries a roller 103 cooperating with a cam 104 on the shaft 62. The cam 104 is shaped so the lever 102 may normally assume a position in which the pin 101 lies between the ends of the slot 100. This permits the slides 50 to move to the right as soon as the latches 76 are released from the arms 70.

At the right hand ends of the slides 49 is a punch mechanism, generally designated 106 (FIGS. 3*b* and 6), for punching holes in a tape 107. This mechanism is supported between plates 108 and 109 which are connected by a base plate 110 and a brace member 111 to the plate 38. Extending between and connected to the plates 108, 109 is a guide plate 112 having openings 114 in which two rows of punch pins 115, 116 are slidably received. Each end of the guide plate is recessed at 117 to receive a reduced portion 118 of a yoke 119. Connected to the upper ends of the reduced portions 118 is a plate 120 having openings through which the punch pins 115, 116 extend. Surrounding each of the punch pins is a light spring 121 acting between the plate 112 and a pin collar 122 for holding the latter in a raised position against the plate 120. Extending between and connected to the yokes 119 is a die plate 124 and a stripper plate 125 having openings 126 and 127, respectively, through which the punch pins 115, 116 may be reciprocated.

The springs 121 normally hold the punch pins in raised positions with their lower ends extending part way through the openings 127 as shown in FIG. 6. The die plate 124 and the stripper plate 125 are spaced vertically from each other just far enough to permit the tape 107 to move freely between them. During each cycle of machine operation, the yokes 119 are reciprocated vertically and cause the plate 120, the die plate 124 and the stripper plate 125 to reciprocate with them. For reciprocating the yokes 119, there is provided in each yoke an opening 129 receiving a cam 130 which is fixed to a shaft 131 rotatably supported by the plates 108 and 109. Fixed to one end of the shaft 131 is a bevel gear 132 (FIG. 3*b*) meshing with a bevel gear 133 on shaft 62. Attached to the plates 108, 109 are two plates 135 and 136 having openings 137, 138, respectively, in alignment with the punch pins 115 and 116. The plate 135 is recessed, as shown in FIG. 6, to provide a space 140 into which the right ends of the slides **49*b* extend. Just below the plate 135 is a member 141 over which the slides 49*a* are movable to positions above the pins 115 when the latter are moved downwardly with the yokes 119. Member 141 is connected by a bolt 142** (FIGS. 3*b* and 4*b*) to the right end of the guide member 44.

When the yokes 119 are in their lower positions, the upper ends of the punch pins 115 lie below the top surface of the member 141 and the upper ends of the pins 116 lie below the top surface of the recessed portion of the plate 135. If none of the slides are in positions overlying the punch pins, an upward movement of the yokes 119 causes the pins to move with them until the upper ends of the pins 115 extend into the openings 137 in the plate 135 and the upper ends of the pins 116 extend into the openings 138 in the plate 136. It will be noted that there are six punch pins in the row including the pins 116, five of them operating to punch character code holes in the tape and the sixth pin operating to punch a feed hole 144. The pin 145 punching the feed hole always acts against a blank surface on the plate 135 so it is operated on each machine cycle. The right ends of the slides 49 are provided, as shown in FIG. 13*b*, with projecting portions 146 adapted to move into positions over one or more of the punch pins when the slides are moved to the right. For instance, the "letter" shift slide **49*b* has projecting portions 146 arranged to overlie all of the punch pins 116 to cause a punching of a code hole in each position on the tape 107. The "figure" shift slide 49*b* has projections 146 arranged to overlie all of the punch pins 116 except that punching the center code hole. Each of the slides 49*a* has a projecting portion 146 arranged to overlie only one of the punch pins 115. The projecting portion on the upper one of the slides 49*a* is arranged to overlie the pin 115 at the rear end of the row as shown in FIG. 6. Each lower slide controls the operation of the next punch pin 115** toward the front.

At the beginning of each machine cycle, the yokes 119 are in their lower positions and the upper ends of the punch pins 115, 116 are at points permitting movement to the slides 49 to the right. If one of the slides **49*b* and one or more of the slides 49*a* are moved to the right, then a raising of the yokes 119 during a machine cycle will cause a punching by the pins 116 of either a "letter" or a "figure" shift code and a punching by the pins 115 of a character code. If only slides 49*a*** are moved to the right, only the punching of a character code will take place.

During the first machine cycle after starting, a punching of either the "letter" or "figure" shift code as well as the punching of a character code takes place. If an alphabetic character is the first one punched, then a "letter" shift code is punched with it. As long as type keys for alphabetic characters are depressed to produce succeeding machine cycles, only a punching of character codes takes place. When an operation takes place to punch a numeric character, the "figure" shift slide moves to cause a punching of the "figure" shift code simultaneously with the punching of the character code. Operations to punch numeric characters during succeeding cycles results only in the punching of character codes.

The operation described above is made possible by a mechanism which includes, as shown in FIGS. 7 to 12, a latch member 150 fixed to a pin 151 pivotally mounted on an angle member 152 carried by a cross plate 153. Fixed to the pin 151 is a cross arm 154 carrying pins 155, 156 at opposite sides of the pin 151. Another arm 158 is connected to the pin 151 and is urged in either direction by a toggle spring 159 when moved from a normal position in alignment with the slides 49. A spring urged arm 160 is provided with a notch engaging a pin 161 on the arm 158 for detenting the latter in its normal position. At this time, the arm 154 extends at right angles to the slides 49. The slides **49*b* are provided at their left ends with slots 162 through which the pin 151 extends. The pins 155, 156 project upwardly adjacent the outer edges of the slides 49*b*, and pin 155 is engageable by an outwardly projecting shoulder 163 on the "LTR" slide while the pin 156 is engageable by an outwardly projecting shoulder 164 on the "FIG" slide. The "LTR" slide also has an inwardly projecting shoulder 165 engageable with the latch member 150, while the "FIG" slide has an inwardly projecting shoulder 166** engageable with the same latch member.

Slidably mounted on the cross arm 154 just below the latch member 150 is a T-shaped member 168 which is continuously urged to the right by a spring element 169. An elongated slot 170 in the member 168 receives the pin 151 and a guide pin 171. Arms 172 and 173 on the T-shaped member are engageable with the pins 155, 156, respectively, for rocking the cross arm 154 to its right angle position shown in FIG. 7. Pivotally connected to the left end of the T-shaped member is a lever 175 mounted on the bar 95 and carrying a roller 176 (FIG. 3*a*) engageable with a cam 177 on the shaft 62. During the early part of the first machine cycle after starting, the lever 175 is actuated by the cam 177 to move the T-shaped member to the left. On one side of the T-shaped member 168 is a tooth 179 engageable by a latch element 180 for holding the member 168 in the left hand position to which it is moved by the cam 177. The latch element 180 has a tail portion 181 which is engaged by a hooked arm 182 (FIG. 3*a*) when a switch 183 for the machine is turned on. The arm 182 is pivotally connected to a lever 184 which is, in turn, connected by a link 185 to the switch 183. Formed on the arm 182 is a cam portion 186 engageable with a projection 187 on a supporting plate 188 when the lever 184 is actuated by movement of the switch 183 to its "off" position. Engagement of the cam portion 186 with the projection 187 causes the hooked arm 182 to be swung free of the latch element so it rests against the side of the T-shaped member 168.

Before starting the machine, various parts of the mechanisms described are in the positions shown in FIGS. 3*a*, 3*b* and 7. It will be noted that the T-shaped member 168 is held by the spring element 169 against the pins 155 and 156 so the latch member 150 is positioned midway between the slides **49*b*. As the switch 183 is moved to its "On" position, the hooked arm 182 is shifted to a position engaging the tail portion 181 on the latch element 180. At the same time, contacts 190 are closed to complete a circuit through a motor 191 which drives the shaft 12 in FIG. 2. Upon actuating any one of the keys 1, the link 10 is operated to engage a clutch for driving the shaft 14 by the shaft 12 through one revolution. Shaft 14 is extended through an opening in the plate 38 and carries a bevel gear 192 meshing with a bevel gear 193 fixed to the shaft 62. As soon as shaft 62 starts rotating, the cam 177 actuates the lever 175 to move the T-shaped member 168 to the position shown in FIG. 8. The latch element 180 then engages the tooth 179 and holds the member 168 in its retracted position as long as the switch 183** remains in its "On" position.

Assuming that the first key actuated is for an alphabetic character, the bails 20 to 25 rocked as a result of the depression of such key lever will release latches 76 to permit movement of slides 50 so as to align openings 68 at a character position corresponding to that of the key actuated. As soon as the unlatched slides 50 have moved, the cam 61 (FIG. 5) permits the arms 53, 54 and 55 to swing for raising the rod 58 and releasing all of the sensing pins 51. The sensing pin at the character position in which the openings 68 are aligned will move upwardly through these openings and also through openings 80, 81 in slides **49*a*. Since it is an alphabetic character position at which the openings 68 are aligned, then the sensing pin also passes through an opening 83 in the "FIG" slide 49*b* and the elongated slot 85 in the "LTR" slide 49*b*. After the sensing pin has been moved through the openings in all of the slides, the cam 98 permits the lever 94 to swing counterclockwise and free the slides 49 for control by the sensing pin. The slides 49*a* having elongated openings 81 through which the sensing pin extends move to the right and position their projecting portions 146 over punch pins 115, causing the latter to punch holes in the tape 107 representative of the alphabetic character. Since the sensing pin extends through an opening 83 in the "FIG" slide 49*b*, this slide is held against movement. The "LTR" slide moves to the right, however, since the pin is received within the elongated slot 85 of this slide. This movement causes projections 146 to be positioned over the punch pins 116** for effecting actuation of the latter to punch the "letter" shift code.

As the "LTR" slide moves to the right, its shoulder 163 engages the pin 155 (FIG. 10) and swings the cross arm 154 clockwise so the latch member 150 bears against the end of the inwardly projecting shoulder 165 on the same slide. The toggle spring 159 now acts on the arm 158 for holding the cross arm 154 in the position to which it has been moved. After the punching of the tape is completed, all of the slides 49 are moved to the left by the lever 94. When the "LTR" slide reaches its left position, the latch member 150 moves in front of the shoulder 165 and holds this slide against movement to the right when the lever 94 is again rocked counterclockwise. Continued actuation of other letter keys 1 will result in movement of corresponding sensing pins through the openings in the slides. Each of these pins will extend through an opening 83 in the "FIG" slide to hold it against movement, and the "LTR" slide will be held by the latch member 150. Only the slides 49*a* will move to cause actuation of punch pins for punching character codes in the tape.

Figure 9:
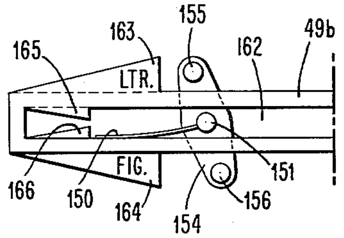
Figure 10:
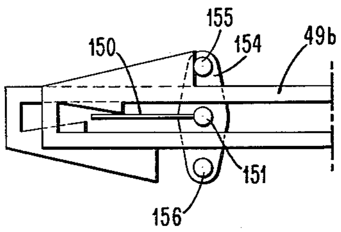
Figure 11:
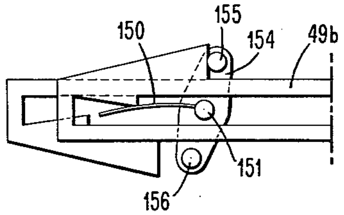
Figure 12:
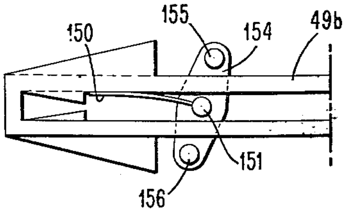

As soon as a key 1 for a numeric character is actuated, a sensing pin will move through openings in the slides 50 and 49*a* as before. In the numeric character location, however, the sensing pin passes through the elongated slot 84 inthe "FIG" slide and an opening 86 in the "LTR" slide. The "FIG" slide is now free to move to the right when the lever 94 is actuated, and the "LTR" slide is now held by the sensing pin. When the "FIG" slide moves to the right, its shoulder 164 engages the pin 156 and swings the cross arm 154 to its opposite position. The latch member then bears against the end of the inwardly projecting shoulder 166 until the "FIG" slide is moved to the left and permits the latch member to move in front of its shoulder 166, as shown in FIG. 9. It will be seen that a movement of the "FIG" slide to the right with the slides 49*a* results in a punching of both the "figure" shift code and the numeric character code. If other numeric keys 1 are depressed, the sensing pin will hold the "LTR" slide by its engagement with an opening 86, and the "FIG" slide will be held by the latch member 150. Only the slides 49*a* move to cause a punching of character codes. This continues until an alphabetic key is depressed and causes movement of the "LTR" slide for rocking the cross arm 154 again to the position of FIG. 12. A "letter" shift code is punched at the same time and then the slide is latched by the member 150. When the switch 183 is operated to stop the machine, the hooked arm 182 disengages the latch 180 from the T-shaped member so the latter moves to the right under the action of the spring element 169 and engages the pins 155, 156 for positioning the cross arm 154 at right angles to the slides with the latch member 150 in a neutral position.

It is necessary that the tape 107 be moved one unit space each time a character code alone is punched. When a shift code is also punched, it is necessary that the tape be moved an additional unit space. For accomplishing this, there is provided a wheel 196 (FIG. 6) haveing pins 197 engaging the feed holes 144 in the tape. This wheel is fixed to a shaft 198 rotatably supported by the plates 108, 109. Mounted upon the shaft 198 is a ratchet wheel 200 (FIG. 4*b*) which may be actuated by either one of two dogs 201 and 202. Dog 201 is pivotally connected to an arm 203 mounted loosely on the shaft 198, and is continously urged by a spring into engagement with the ratchet wheel. A link 204 connects the arm 203 to an arm 205 pivotally attached to the plate 109, and a spring 206 urges the arm 205 in a direction to hold a roller 207 in engagement with a cam 208 fixed to the shaft 131. Dog 202 is pivotally attached to an arm 210 mounted loosely on the shaft 198 and connected by a link 211 to the arm 205. A member 212 is pivotally connected to the plate 109 and carries a pin 214 which is slidably received within a notch 215 in the dog 202. The upper end of the member 212 is normally engaged by a latch 216 which holds it in a position to keep the dog 202 free from engagement with the ratchet wheel. With the dog 202 held free of the ratchet wheel, a rocking of the arm 205 in a clockwise direction as the cam 208 turns with the shaft 131 causes the dog 201 to engage the next tooth on the ratchet wheel 200. When the punching of the tape has been completed, the arm 205 is rocked in a counterclockwise direction and actuates the dog 201 to turn the ratchet wheel one tooth space. If the latch 216 is moved out of engagement with the member 212, the latter turns counterclockwise and rocks the dog 202 into engagement with the ratchet wheel. A swinging of the arm 205 in a clockwise direction then causes the dog 202 to rotate the ratchet wheel one tooth space before punching takes place, and a swinging of the arm 205 in the opposite direction causes the dog 201 to rotate the wheel another tooth space after punching.

Latch 216 is normally held by a spring 218 in a position to engage the member 212 but is released from the member each time one of the slides 49*b* is moved. For accomplishing this there is provided a link 219 connecting the latch 216 to two levers 220, 221 (FIG. 3*b*). Downwardly bent nose portions 222, 223 (FIGS. 3*b* and 13*b*) on the levers 220, 221 project through a slot 224 in the guide plate 44 and through slots 225 in the slides 49*b*. At the left end of each slot 225 is a web portion 227 which acts on the nose portions for swinging the levers 220, 221 in a clockwise direction when the slides 49*b* move to the right. A swinging of either lever in this direction produces a pull on the link 219 for releasing the latch 216 from the member 212. Each time one of the slides 49*b* moves to the right, the latch 216 is released to effect engagement of the dog 202 with the ratchet wheel 200. The arm 205 is then rocked clockwise to advance the ratchet wheel one tooth space before punching of the tape takes place. As the arm returns to its home position, the ratchet wheel is advanced by the dog 201 another tooth space. Formed on the member 212 is a tail portion 228 engageable with a cam 229 on the shaft 131 when the member is released by the latch. During the latter part of the machine cycle, the cam 229 rocks the member 212 to a position in which it is re-engaged by the latch 216. For each turning of the ratchet wheel one tooth space, the wheel 196 (FIG. 6) is rotated to advance the tape to a new punching position. Fixed to the shaft 198 at its end opposite the ratchet wheel is a detent mechanism 230 (FIG. 3*b*) for preventing rotation of the shaft in the opposite direction.

While there has been shown and described in this application one form which the invention may assume in practice, it will be understood that it may be modified and embodied in various other forms without departing from the spirit of the invention.

What is claimed is:

1. A tape punching mechanism comprising, in combination, a first set of punch elements, a set of movable members, each associated with a different one of said punch elements, said members being movable from a home position to an operating position in which they effect actuation of the punch elements associated therewith to punch a character code, a second set of punch elements, a pair of members movable individually from a home position to an operating position in which they effect actuation of different combinations of said second set of punch elements to punch either a "letter" shift or a "figure" shift code, a plurality of control elements cooperating with said movable members at different points corresponding to alphabetic and numeric characters, means for moving said control elements selectively into operative positions for controlling said movable members, each of said control elements acting when in an operative position to hold one or more of said set of members and one or the other of said pair of members, means operating after movement of one of said control elements to its operative position for moving all of said members not held thereby to their operative positions, a latch element, means operating on movement of one of said pair of members to engage said latch element therewith when returned to its home positions for holding it against movement, means operating on movement of the other of said pair of members to shift said latch element out of engagement with the member held and into engagement with the member moved when returned to its home position, means for feeding a tape past said punch elements, said feeding means operating after each punching of the tape to advance the latter one unit distance, means operating on movement of either one of said pair of members to advance said tape another unit distance before punching takes place, and power means for actuating said punch elements and for returning said members to their home positions after each punching operation.

2. The mechanism of claim 1 in which said set of members and said pair of members are provided at each character position with openings which are in alignment with each other when said members are in their home positions, said openings adapted to receive said control elements when moved to their operative positions and being of such length that each of said members is either held by a control element against movement or is permitted to move to its operative position.

3. The mechanism of claim 2 in which the one of said pair of members effecting the punching of a "letter" shift code is provided at each alphabetic character position with an opening which permits it to move relative to any control element extending therethrough and is provided at each numeric character position with an opening of such length that it prevents movement relative to each control element, and in which the one of said pair of members effecting the punching of a "figure" shift code is provided at each alphabetic character position with an opening of such length that it prevents movement relative to each control element and is provided at each numeric character position with an opening which permits movement relative to any control element, extending therethrough.

4. The mechanism of claim 1 including control means movable manually to "On" and "Off" positions for starting and stopping said power means, and means operating on movement of said control means to "Off" position for shifting said latch element to a position out of engagement with both of said pair of members.

5. A mechanism connected to a typewriter and operating simultaneously therewith for punching into tape the information typed comprising, in combination, a first group of members movable from a home position to an operating position, means for urging said members continuously toward their operating position, latch elements normally engaging said members for holding them in their home positions, means connecting said latch elements to said typewriter and operating to release said latch elements in combinations representative of the characters typed, a first set of punch elements, a second group of members movable from a home position for effecting operation of said punch elements to punch a character code, a second set of punch elements, a pair of members movable selectively from a home position for effecting operation of said second set of punch elements to punch either a "letter" shift or a "figure" shift code, a plurality of control elements cooperating with said members at different character positions, openings in said first group of members normally out of alignment with each other at each character position but shifting into alignment, on movement of said members, at the character position corresponding to that of the moved members, means for engaging said control elements with said first group of members so that an element passes through aligned openings at any character position, openings in said second group of members and said pair of members at each character position and in alignment with each other when said members are in their home positions, said last mentioned openings receiving any control element passing through openings in said first group of members and being of such length that each of said second group of members and said pair of members is either held against movement or is permitted to move from its home position, the openings at each alphabetic character position in one of said pair of members being such as to prevent movement of that member and the openings at each numeric character position in the other of said pair of members being such as to prevent movement of said other member, and latch means engageable with either of said pair of members after movement for holding it against further movement.

6. A mechanism connected to a typewriter and operating automatically to punch in a tape either a "letter" shift code or a "figure" shift code comprising, in combination, a set of punch elements, a pair of members movable from a home position to an operating position in which they effect actuation of said punch elements in different combinations, means normally holding said members in their home positions, means yieldingly urging said member toward their operating positions, control elements located at positions along said members corresponding to alphabetic and numeric characters, said control elements at alphabetic character positions being engageable with one of said members for holding it against movement and said control elements at numeric character positions being engageable with the other of said members for holding it against movement, means connected to said typewriter and operating simultaneously therewith for engaging one of said control elements with one or the other of said members at a position corresponding to the character typed, means for releasing said holding means after engagement of one of said elements with one of said members takes place, a latch member, means for engaging said latch member with either one of said pair of members when it returns from its operating position to its home position, means for shifting said latch member from one of said pair of members to the other when the latter is moved from its home position to its operating position and back, and means operating on movement of either one of said members for feeding said tape.

7. The mechanism of claim 6 in which one of said members is operative to effect a punching of a "letter" shift code and the other is operative to effect a punching of a "figure" shift code, and said control elements at alphabetic character positions are engageable with the one of said members effecting the punching of the "figure" shift code while those at numeric character positions are engageable with the one of said members effecting the punching of the "letter" shift code.

8. The mechanism of claim 6 in which one of said members has openings at alphabetic character positions adapted to receive said control elements at such positions, and the other of said members has openings at numeric character positions adapted to receive said control elements at such positions, each of said control elements operating to hold a member against movement when extending through an opening therein, and said means connected to the typewriter operates to move the one of said control elements at the position corresponding to the character typed through one of said openings.

9. The mechanism of claim 6 including power means for driving said typewriter and said punch mechanism, means movable manually to "On" and "Off" positions for starting and stopping said power means, and means operating on movement of said manual means to its "Off" position for disengaging said latch member from either one of said pair of members and holding it in a neutral position.

10. A mechanism connected to a typewriter and operating automatically to punch in a tape either one or another of two character shift codes comprising, in combination, a set of punch elements, a pair of elongated slides movable longitudinally from a home position to an operating position in which they effect actuation of said punch elements in different combinations representing "letter" and "figure" shift codes, means continuously urging said slides toward their operating positions, means normally holding said slides in their home positions, sensing devices located at points along said slides corresponding to various characters to be typed, openings in the one of said slides effecting punching of the "figure" shift code at alphabetic character positions, openings in the one of said slides effecting punching of the "letter" shift code at numeric character positions, means operating simultaneously with the typing of a character for moving the sensing device at the corresponding character position through one of said openings to hold the slide in which the opening is formed, means for releasing said holding means to permit movement of either one of said slides not held, and means operating on the movement of either slide for latching it against further movement.

11. The mechanism of claim 10 in which said latching means comprises a latch member, a shoulder on each of said slides at opposite sides of said latch member, means pivotally supporting said latch member for movement in either direction from a home position into a position in which it engages said shoulder on either slide when the latter has been moved to its home position, and means operating on movement of either slide to its operating position for pivoting said latch member toward the one of said slides which is moved.

12. The mechanism of claim 11 including power means for driving said typewriter and operating said punch mechanism, means movable manually to "On" and "Off" positions for starting and stopping said power means, and means operating on movement of said manual means to its "Off" position for returning said latch member to its home position.

References Cited in the file of this patent

UNITED STATES PATENTS 2,882,972 Salmon et al. ............ Apr. 21, 1959